United States Patent
Endo

(10) Patent No.: US 10,659,632 B2
(45) Date of Patent: May 19, 2020

(54) DISPLAY APPARATUS, IMAGE FORMING APPARATUS, AND NON-TRANSITORY COMPUTER READABLE MEDIUM FOR MENU DISPLAY

(71) Applicant: FUJI XEROX CO., LTD., Tokyo (JP)

(72) Inventor: Yasuhiro Endo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/659,627

(22) Filed: Jul. 26, 2017

(65) Prior Publication Data

US 2018/0183954 A1 Jun. 28, 2018

(30) Foreign Application Priority Data

Dec. 28, 2016 (JP) ................. 2016-256489

(51) Int. Cl.
*G06F 3/12* (2006.01)
*H04N 1/00* (2006.01)

(52) U.S. Cl.
CPC ..... *H04N 1/00472* (2013.01); *H04N 1/00037* (2013.01); *H04N 1/00411* (2013.01); *H04N 1/00413* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,809,724 B1 * | 10/2004 | Shiraishi | G06F 1/163 345/157 |
| 9,244,556 B2 | 1/2016 | Ashikawa | |
| 2006/0123357 A1 * | 6/2006 | Okamura | G06F 3/0482 715/786 |
| 2006/0244735 A1 * | 11/2006 | Wilson | G06F 3/0488 345/173 |
| 2011/0018827 A1 * | 1/2011 | Wang | G06F 3/0485 345/173 |
| 2014/0225854 A1 * | 8/2014 | Ashikawa | G06F 3/0488 345/173 |
| 2015/0007106 A1 * | 1/2015 | Ishii | G06F 3/0482 715/808 |
| 2015/0163369 A1 * | 6/2015 | Komaba | H04N 1/00469 358/1.15 |
| 2016/0335240 A1 * | 11/2016 | Feng | G06F 3/048 |

FOREIGN PATENT DOCUMENTS

WO 2013047023 4/2013

* cited by examiner

*Primary Examiner* — Henok Shiferaw
(74) *Attorney, Agent, or Firm* — JCIPRNET

(57) ABSTRACT

A display apparatus includes a display, a detection unit that detects an operation position of a user on the display, and a controller that displays an entire menu corresponding to the detected operation position at a position corresponding to the operation position, and displays a balloon indicating the operation position.

9 Claims, 12 Drawing Sheets

DISPLAY APPARATUS, IMAGE FORMING APPARATUS, AND NON-TRANSITORY COMPUTER READABLE MEDIUM FOR MENU DISPLAY

CROSS-REFERENCE TO RELATED APPLICATIONS

This application is based on and claims priority under 35 USC 119 from Japanese Patent Application No. 2016-256489 filed Dec. 28, 2016.

BACKGROUND (i) Technical Field

The present invention relates to a display apparatus, an image forming apparatus, and a non-transitory computer readable medium.

(ii) Related Art

In the related art, if any position on a screen is clicked with a mouse or the like, a pop-up is displayed at a predetermined position on the screen in some cases. Basically, since the pop-up is fixedly displayed at a predetermined position, the pop-up may not be displayed depending on the clicked position.

For example, a menu appears on the screen at a time of right clicking on Windows (registered trademark) PC, and the display position of the menu is determined according to the right click position. In Windows, in order to prevent the menu from being cut and displayed when there is not a margin for the menu, the end of the menu is displayed so as to be positioned at the end of the screen. In this case, since the entire menu is displayed close to the click point, the user's point of view does not move. However, since there is no indicator indicating the click point, it is difficult to know which icon is clicked to display the menu.

Meanwhile, there is also a technique of displaying a balloon to indicate which icon is clicked to display the menu.

SUMMARY

According to an aspect of the present invention, there is provided a display apparatus including a display; a detection unit that detects an operation position of a user on the display; and a controller that displays an entire menu corresponding to the detected operation position at a position corresponding to the operation position, and displays a balloon indicating the operation position.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

Figure 1:
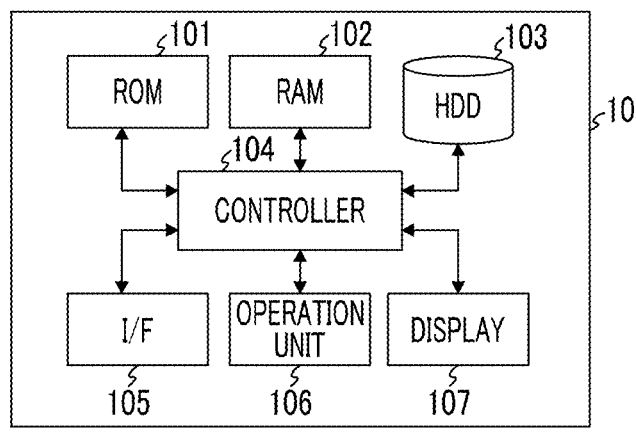
FIG. 1 is a block diagram illustrating a configuration of a display apparatus.

FIG. 1 is a block diagram illustrating a configuration of a display apparatus according to the present exemplary embodiment. A display apparatus 10 has the same configuration as that of a personal computer (PC), a tablet terminal, or the like, and includes a ROM 101, a RAM 102, a HDD 103, a controller 104, an interface (I/F) 105, an operation unit 106, and a display 107.

Specifically, the controller 104 is configured with one or plural CPUs, reads a processing program stored in the ROM 101 or the HDD 103, and executes various processes using the RAM 102 as a working memory, whereby various types of information is displayed on the display 107.

The interface (I/F) 105 transmits and receives data to and from other information apparatuses through a network. The operation unit 106 is a keyboard, a mouse, or the like. The display 107 is a liquid crystal display, an organic EL display, or the like. The display 107 may be a touch panel.

The controller 104 executes various processes according to a processing program. In the present exemplary embodiment, in particular, in response to a click operation of a mouse which is the operation unit 106, or a touch operation (or a tap operation) by a user on a touch panel in a case where the display 107 is the touch panel, the controller 104 detects the operation position thereof, displays a menu corresponding to the detected operation position on the display 107, and displays a balloon indicating the operation position. The controller 104 adaptively displays the menu at a position where the entire menu can be displayed according to the operation position, instead of displaying the menu at a fixed position. Generally, if the operation position is on the lower side of the display 107, there can be the display space on the upper side of the operation position, such that the controller 104 displays the entire menu on the upper side of the operation position. If the operation position is on the right side of the display 107, there can be the display space on the left side of the operation position, such that the controller 104 displays the entire menu on the left side of the operation position.

Regarding the balloon, in a case where the display apparatus 10 is a PC or the like, the operation position is indicated as a pointer such as a cursor, but since the position is unknown if the screen transitions, it is meaningful to display the balloon. Further, since the pointer is not displayed in the case of the touch panel, it can be said that the significance of displaying the balloon is great. Furthermore, in the configuration in which only a menu is displayed in the vicinity of the operation position, in a case where plural buttons or icons are arranged in parallel, it is difficult to know which button or icon is operated for the menu, such that the significance of displaying a balloon and indicating an operation position is great.

In the configuration of FIG. 1, the controller 104 also functions as a detection unit that detects the operation position, but it may be configured such that a sensor unit that detects the operation position is provided separately from the controller 104, and the detected operation position is provided to the controller 104.

Figure 2:
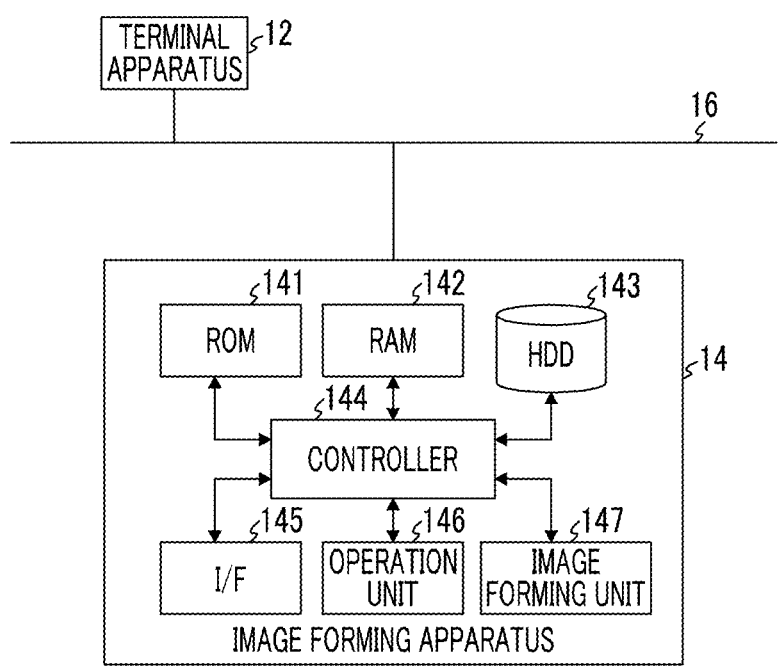
FIG. 2 is a block diagram illustrating a configuration of an image forming system.

FIG. 2 is a diagram illustrating another configuration of the present exemplary embodiment, which is a block diagram illustrating a configuration of an image forming system including an image forming apparatus. The image forming system includes a terminal apparatus 12 and an image forming apparatus 14. The terminal apparatus 12 and the image forming apparatus 14 are connected through a communication unit 16. As the communication unit 16, for example, a data communication network such as a local area network (LAN) is used.

The terminal apparatus 12 is connected to the image forming apparatus 14 through the communication unit 16, and transmits a print job or the like including a print instruction of a document according to a user's instruction.

The image forming apparatus 14 includes a ROM 141, a RAM 142, an HDD 143, a controller 144, an interface (I/F) 145, an operation unit 146, and an image forming unit 147.

Specifically, the controller 144 is configured with one or plural CPUs, and according to the processing program stored in the ROM 141 or the HDD 143, the controller 144 receives a print job command or the like from the terminal apparatus 12 through the I/F 145, interprets the PDL data to generate intermediate data, and further generates drawing data (raster data) from the generated intermediate data. Further, the controller 144 executes various commands such as Copy, Scan, and Fax, which are received from the operation unit 146.

The image forming unit 147 includes a print module, a scanner module, a fax module, a paper feed module, a document feed module, and an image processing accelerator.

The print module is a module having a function of outputting an image on paper. For example, the print module has a known inkjet-type configuration, and prints drawing data on paper. A liquid or melted solid ink is ejected from a nozzle or the like, and recording is performed on paper, film, or the like. A method of ejecting ink include a drop-on-demand method (a pressure pulse method) in which ink is ejected using electrostatic attraction, a thermal ink jet method in which ink is ejected using pressure generated by forming and growing bubble by high heat, and the like. The recording head includes, for example, a head that ejects cyan ink, a head that ejects magenta ink, a head that ejects yellow ink, and a head that ejects black ink, and a line head of which width is at least equal to the width of paper is used. An ink droplet of each color is ejected and recorded onto an intermediate transfer member by the recording head, and thereafter, the ink droplet is transferred to a sheet and printed.

The scanner module is a module that reads an image from the paper and converts the image into electronic data.

The fax module includes an image processing module for a modem or a fax, and is used to execute a fax function.

The paper feed module is used to convey paper from a paper tray to the print module.

The document feed module is used to convey paper from a document tray to the fax module.

The image processing accelerator is a module that performs compression and decompression processes in conjunction with the scanner module or the like. The image processing accelerator is not indispensable, and may be an additional module.

In addition to the above, the image forming apparatus 14 may also include a finisher that performs punching and sorting of paper, an authenticating unit which is configured with a USB, an IC card reader, or the like and performs user authentication, a billing unit, a human sensor, or a face camera, or the like.

Further, the image forming apparatus 14 may be connected to the Internet through the communication unit 16, and may have Ethernet (registered trademark) or WiFi (registered trademark).

The operation unit 146 is configured with, for example, a touch panel.

The controller 144 displays various types of information on the screen of the operation unit 146, displays a menu corresponding to the position of the press-down operation such as a touch operation on the screen in response to the touch operation by the user on the operation unit 146, and displays a balloon on the menu.

Hereinafter, the operation of the controller 104 of the display apparatus 10 will be described in more detail. The same applies to the operation of the controller 144 basically.

Figure 3:
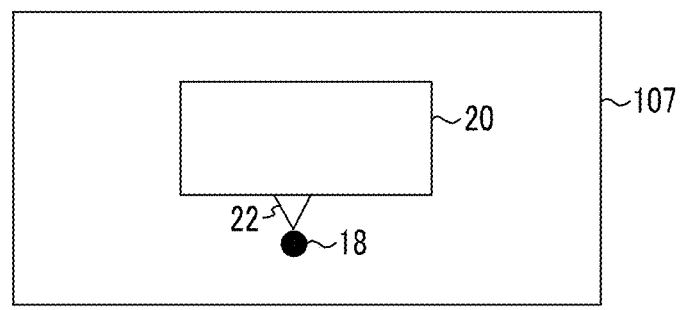
FIG. 3 is a schematic explanatory diagram of a menu and a balloon.

FIG. 3 shows the basic form of the menu 20 displayed on the display 107. The pressed position which is the operation position where the user clicks the mouse or touches the touch panel is indicated by a black circle 18 in the FIG. 3. The controller 104 pops up the menu 20 corresponding to the icon of the pressed position indicated by the black circle 18. At this time, the controller 104 forms and displays the balloon 22 in the menu 20 so as to indicate the black circle 18 in the pressed position. The tip of the balloon 22 is displayed so as to be positioned in the vicinity of the black circle 18 which is the pressed position.

Figure 4:
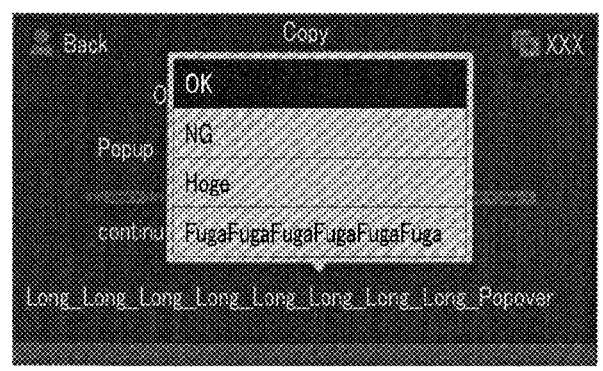
FIG. 4 is a diagram illustrating an example of the menu and the balloon.

FIG. 4 shows a display example of a specific menu. Upon detecting the pressed position, the controller 104 displays the menu 20 corresponding to the icon of the pressed position on the upper side of the pressed position and displays the balloon 22 so as to indicate the pressed position. If the user visually recognizes the menu 20 with the balloon 22 as described above, the user can easily visually recognize which icon is associated with the menu 20.

It is conceivable that the menu 20 is fixedly displayed, for example, on the upper side of the pressed position. However, in this case, if the pressed position is on the upper side of the display 107, the menu 20 may not be displayed as a whole. Therefore, the controller 104 displays the menu 20 in an adaptive position according to the pressed position, instead of fixedly displaying the menu 20. Specifically, the controller 104 displays the menu 20 according to a predetermined priority, according to the processing program. That is, with the operation position as the pressed position, (1) First, the menu 20 and the balloon 22 are displayed on the upper side of the pressed position, (2) The menu 20 and the balloon 22 are displayed on the left side of the pressed position, in a case where they cannot be displayed on the upper side of the pressed position, (3) The menu 20 and the balloon 22 are displayed on the right side of the pressed position, in a case where they cannot be displayed on the left side of the pressed position, (4) The menu 20 and the balloon 22 are displayed on the lower side of the pressed position, in a case where they cannot be displayed on the right side of the pressed position, (5) The menu 20 and the balloon 22 are displayed with right alignment or left alignment in a case where they cannot be displayed on the lower side of the pressed position, and (6) The menu 20 and the balloon 22 are displayed according to the algorithm of displaying them in the center of the display 107, in a case where they cannot be displayed with right alignment or left alignment.

Overall Process

Figure 5:
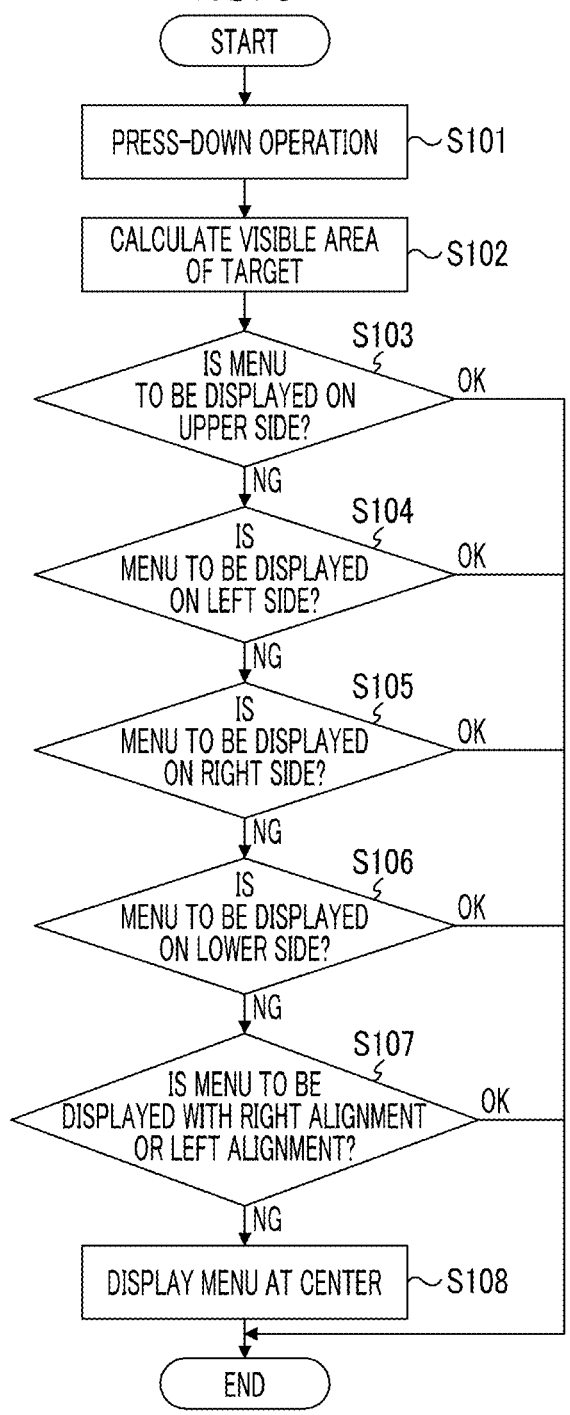
FIG. 5 is a flowchart of a whole process.

FIG. 5 shows a processing flowchart of the controller 104.

The controller 104 detects a press-down operation by the user, for example, a tap operation of a button displayed on the display 107 (S101).

Upon detecting the press-down operation, the controller 104 specifies the pressed position, and calculates the visible area of the button, the icon, or the like (hereinafter referred to as a target) at the pressed position (S102). In addition, the target has the meaning that it is the destination indicated by the balloon 22 of the menu 20. The reason for calculating the visible area of the target is that as for the target that the user presses down, the whole image thereof is not necessarily visible to the user. For example, in a case where the area where the target is disposed is a scrollable area, the user may press down the target which is partially displayed.

After calculating the visible area of the target, the controller 104 first determines whether or not the menu 20 and the balloon 22 can be displayed on the upper side of the target so as to indicate the visible area of the target calculated in S102 (S103). Specifically, the size of the margin existing on the upper side of the target is calculated based on the position of the target, and it is determined whether or not there is a size capable of displaying the entire menu 20. In a case of (overall size of the menu 20)≤(size of the margin), it is determined that it can be displayed on the upper side of the target (OK in S103), the controller 104 pops up the menu 20 and the balloon 22 corresponding to the target on the upper side of the target. For example, the menu is displayed as in FIG. 4. Since the contents of the menu 20 change according to the icon or button which is a target, the overall size of the menu 20 can also be changed according to the target.

Figure 6:
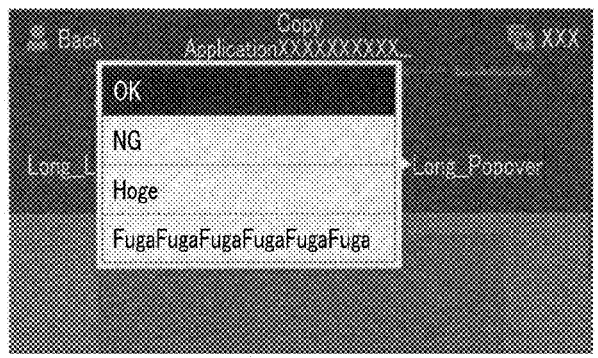
FIG. 6 is a diagram illustrating an example where the menu is popped up on the left side of a target.

When the menu 20 and the balloon 22 cannot be displayed on the upper side of the target (NG in S103), the controller 104 determines whether or not the menu 20 and the balloon 22 can be displayed on the left side of the target (S104). Specifically, the size of the margin existing on the left side of the target is calculated based on the position of the target, and it is determined whether or not there is a size capable of displaying the entire menu 20. In a case of (overall size of the menu 20)≤(size of the margin), it is determined that it can be displayed on the left side of the target (OK in S104), the controller 104 pops up the menu 20 and the balloon 22 corresponding to the target on the left side of the target. FIG. 6 shows an example of a pop-up display on the left side of the target.

Figure 7:
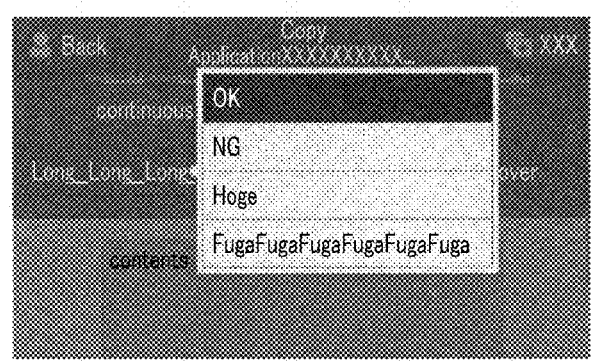
FIG. 7 is a diagram illustrating an example where the menu is popped up on the right side of the target.

When it cannot be displayed on the left side of the target (NG in S104), the controller 104 next determines whether or not the menu 20 and the balloon 22 can be displayed on the right side of the target (S105). Specifically, the size of the margin existing on the right side of the target is calculated based on the position of the target, and it is determined whether or not there is a size capable of displaying the entire menu 20. In a case of (overall size of the menu 20)≤(size of the margin), it is determined that it can be displayed on the right side of the target (OK in S105), the controller 104 pops up the menu 20 and the balloon 22 corresponding to the target on the right side of the target. FIG. 7 shows an example of a pop-up display on the right side of the target.

Figure 8:
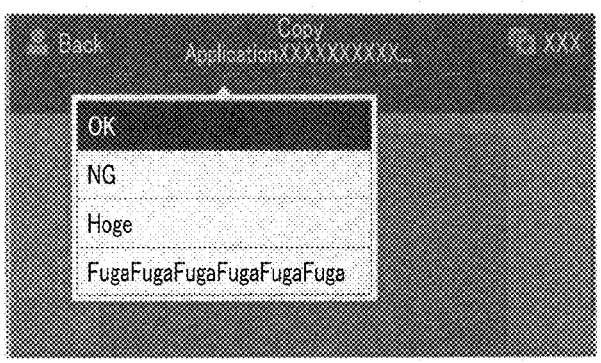
FIG. 8 is a diagram illustrating an example where the menu is popped up on the lower side of the target.

When it cannot be displayed on the right side of the target (NG in S105), the controller 104 next determines whether or not the menu 20 and the balloon 22 can be displayed on the lower side of the target (S106). Specifically, the size of the margin existing on the lower side of the target is calculated based on the position of the target, and it is determined whether or not there is a size capable of displaying the entire menu 20. In a case of (overall size of the menu 20)≤(size of the margin), it is determined that it can be displayed on the lower side of the target (OK in S106), the controller 104 pops up the menu 20 and the balloon 22 corresponding to the target on the lower side of the target. FIG. 8 shows an example of a pop-up display on the lower side of the target.

Figure 9:
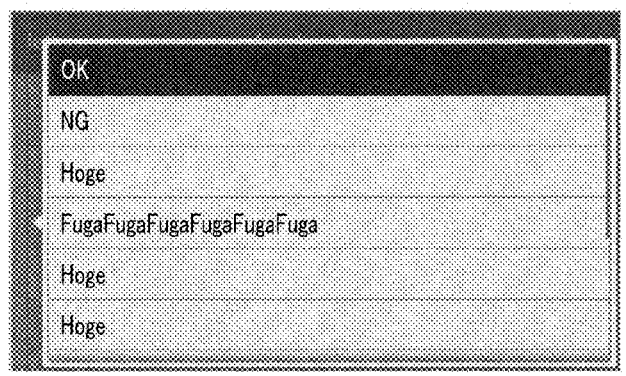
FIG. 9 is a diagram illustrating an example where the menu is popped up to right.

In a case where there is not sufficient margin corresponding to the size of the menu 20 and the menu cannot be displayed any of the upper side, the left side, the right side, and the lower side of the target (NG in S106), the controller 104 displays the menu 20 and the balloon 22 according to the target with right alignment or left alignment of the display 107 (S107). FIG. 9 shows an example of pop-up display with right alignment.

In a case where it cannot be displayed with right alignment or left alignment (NG in S107), the controller 104 displays the menu 20 corresponding to the target at the center of the display 107 (S108). In this case, it is not necessarily required to display the balloon 22 indicating the menu 20 (however, displaying the balloon 22 is not excluded).

Next, the process of each step will be described in detail.

Calculation of Visible Area of Target

As described above, the target indicated by the balloon 22 is not necessarily visible to the user as a whole. For example, the area where the target is disposed may be scrollable, and the user may tap the target which is partially displayed.

Figure 10:
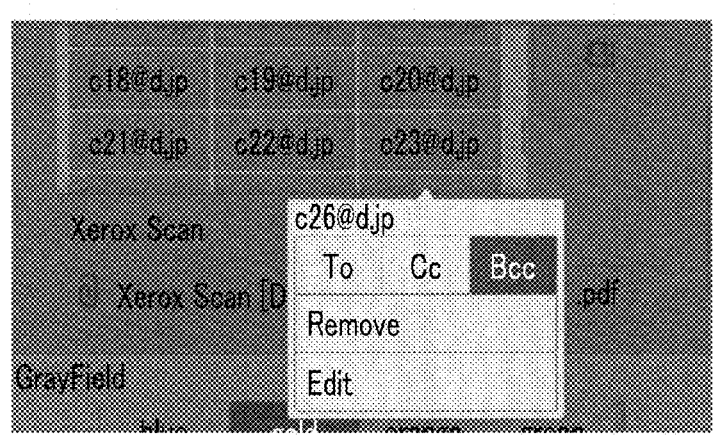
FIG. 10 is a diagram illustrating an example where the menu is popped up in a scrollable area.

FIG. 10 shows an example of such a case. In this state, the area in which the target is disposed is scrollable, and the user taps a screen in a state where only a part of the area is displayed. In this case, a target area visible to the user is detected, a menu 20 and a balloon 22 are generated so as to indicate the visible area, and popped up. In a case where the menu 20 and the balloon 22 are popped up so as to indicate a reference position, with the center position of the tapped icon or button as a reference, an area that the user does not tap and which is not visible to the user is indicated, such that the user will feel uncomfortable. However, since the visible area to the user is a target in this way, the user can easily visually recognize which one is tapped to display the menu 20.

In addition, the area where the target is disposed may be scrollable, and the area outside the area may also be scrollable. In a case where the scrollable area is "nested" in this manner, since the visible area of the target is affected by all the scrollable areas, it is desirable to calculate recursively the visible area of the target.

Figure 11:
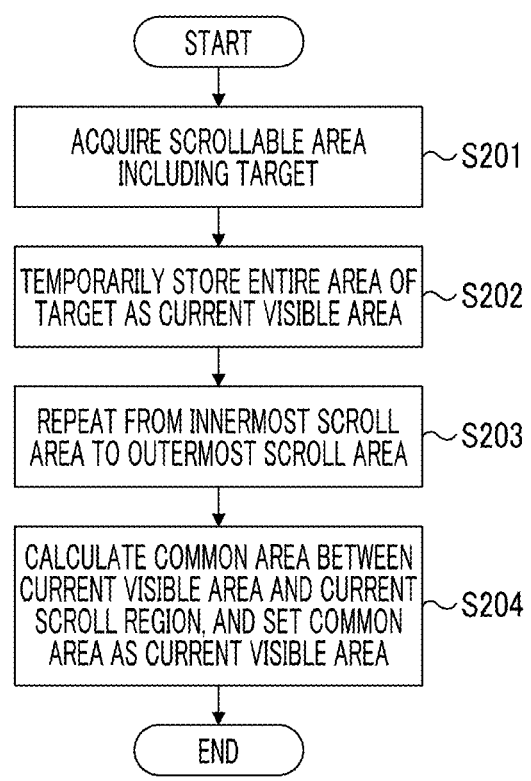
FIG. 11 is a flowchart of a calculation process of a visible area of a scroll area.

FIG. 11 shows a detailed flowchart of S102.

Upon detecting the pressed position, the controller 104 acquires the scrollable area including the target (S201). In a case where the area where the target is disposed is scrollable, and the area outside the area is also scrollable, the outside scrollable area is also acquired.

Next, the entire area of the target is temporarily regarded as the current visible area and stored in the memory (S202).

Next, from the innermost scroll area to the outermost scroll area, a process of calculating a common area between the current visible area and the current scroll area and setting the common area as a current visible area is repeatedly executed (S203 and S204). In a case where only the area where the target is disposed is the scrollable area (in a case where it is not "nested"), first, the entire area of the target is temporarily regarded as the current visible area and stored in the memory as an initial value, in S202. If the entire area of the target is scrolled and in the visible state, the visible area stored in the memory is the visible area of the target as it is. On the other hand, in a case where only a partial area of the target is scrolled, the common area between the current visible area and the current scroll area is calculated as a new visible area in S204 and stored in the memory. In a case where the area outside the area where the target is disposed is also scrollable (in a case where it is "nested"), the common area between the current visible area calculated in this way and stored in the memory and the further outer scroll area is calculated and stored in the memory as a new visible area.

Specifically, it is assumed that the upper left corner of the screen is the origin (0, 0) of the coordinates, and the target area is a rectangle of (x1, y1) to (x2, y2). (x1, y1) is the coordinates of the upper left corner of the rectangular area, and (x2, y2) is the coordinates of the lower right corner of the rectangular area. In the process of S202, (x1, y1) to (x2, y2) are temporarily stored in the memory such as the RAM 102 as the current visible area.

In a case where the current scroll area is (x1, y1) to (x2, y3), here, y1<y3<y2, the common area between the current visible area and the current scroll area is (x1, y1) to (x2, y3), and this area is stored in the memory as a new current visible area.

Note that the upper side as the upper boundary of the visible area of the target described later means (x1, y1) to (x2, y1) of the visible area, and the lower side as the lower boundary of the visible area of the target means (x1, y3) to (x2, y3) of the visible area.

Pop-Up Display on Upper Side of Target

Figure 12A:
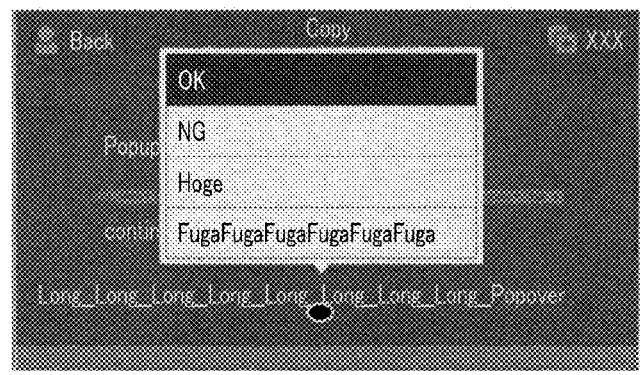
FIGS. 12A and 12B are detailed diagrams (part 1) for popping up a menu on the upper side of a target.
Figure 12B:

FIGS. 12A and 12B show the details in a case of pop-up display on the upper side of the target. FIG. 12A shows the pressed position indicated by a black circle, the menu 20 and the balloon 22, and FIG. 12B shows a part thereof in an enlarged manner. In a case of displaying the menu 20 and the balloon 22, it is necessary to determine the X coordinate and the Y coordinate of the menu 20 with the pressed position as a reference. The controller 104 determines the position of the Y coordinate such that the balloon covers the upper side which is the upper boundary of the visible area of the target by a predetermined amount (for example, four pixels). The X coordinate is determined to be the same as the pressed position. Further, as shown in FIG. 12A, the balloon 22 is determined so as to be the center position in the X direction of the menu 20. However, there may be a case where the balloon 22 cannot be displayed at the center position in the X direction of the menu 20 depending on the pressed position, but in this case, the X coordinate of the balloon 22 is determined by prioritizing the pressed position.

Figure 13:
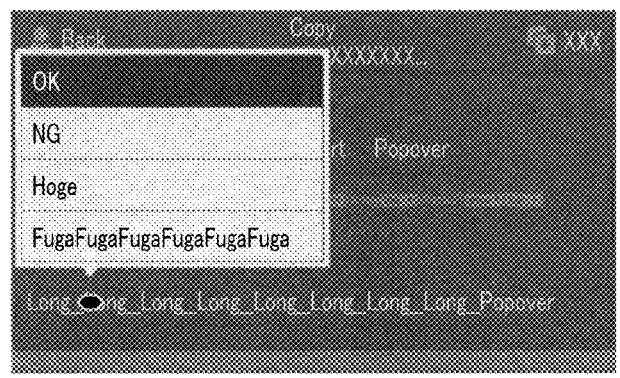
FIG. 13 is a detailed diagram (part 2) for popping up the menu on the upper side of the target.

FIG. 13 shows an example in which the X coordinate of the balloon 22 is determined as the pressed position and the balloon 22 is displayed to left from the center position in the X direction of the menu 20. Even in this case, the user can visually recognize the entire menu 20 and can visually recognize the position pressed to display the menu 20. Further, since the tip position of the balloon 22 is determined with the upper side which is the upper boundary of the visible area of the target as a reference, the display data displayed in the scrollable area can be maintained visible.

Figure 14:
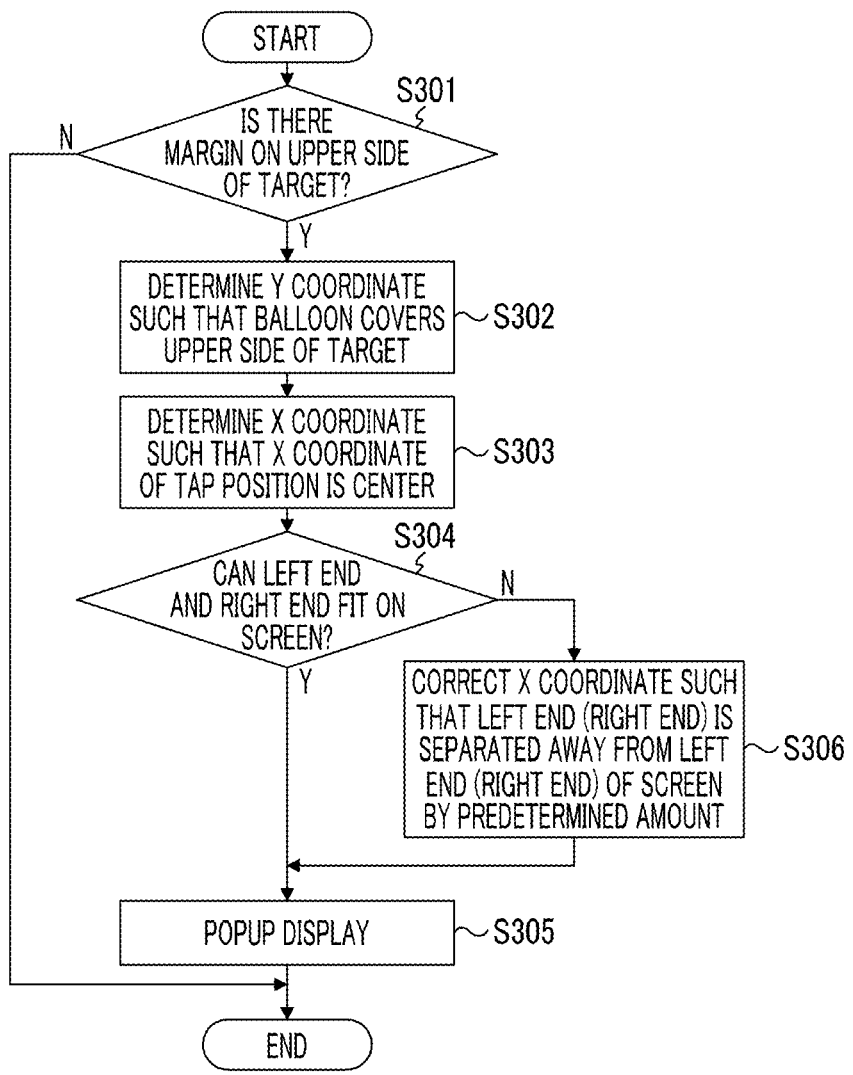
FIG. 14 is a flowchart of a process of popping up the menu on the upper side of the target.

FIG. 14 shows a detailed flowchart of S103.

The controller 104 determines whether there is a margin for displaying the menu 20 and balloon 22 on the upper side of the target (S301). If there is not sufficient margin on the upper side of the target, it is determined to be NG and the process proceeds to S104.

When there is a sufficient margin on the upper side of the target (YES in S301), the controller 104 determines the X coordinate and the Y coordinate of the menu 20. That is, with respect to the Y coordinate, the Y coordinate is determined such that the balloon covers the upper side of the visible area of the target (S302) by a predetermined amount (four pixels). With respect to the X coordinate, the X coordinate is determined such that the X coordinate of the tap position as the pressed position is the center in the X direction of the menu (S303).

Next, after provisionally determining the X coordinate in this way, the controller 104 determines whether or not the left end and the right end of the menu 20 can fit on the screen of the display 107 (S304). In a case where both ends of the menu 20 can fit on the screen (YES in S304), the menu 20 and the balloon 22 are displayed according to the Y coordinate and the X coordinate determined in S302 and S303. The display examples in this case are as shown in FIGS. 12A and 12B.

On the other hand, in a case where the left end of the menu 20 cannot fit on the screen on the display 107 (NO in S304), the X coordinate of the menu 20 is corrected such that the left end of the menu 20 is separated away from the left end of the screen by a predetermined amount (for example, five pixels) (S306). Further, the same applies to the case where the right end of the menu 20 cannot fit on the screen of the display 107 (NO in S304), and the X coordinate of the menu 20 is corrected such that the right end of the menu 20 is separated away from the right end of the screen by a predetermined amount (five pixels) (S306). The display example in the case where the left end of the menu 20 cannot fit on the screen of the display 107 is as shown in FIG. 13, and it illustrates the result obtained by correcting the X coordinate of the menu 20 such that the left end of the menu 20 is separated away from the left end of the screen by five pixels. Since the X coordinate of the balloon 22 is the same as the X coordinate of the pressed point, it is different from the X coordinate of the menu 20. The Y coordinate of the balloon 22 is automatically determined if the Y coordinate of the menu 20 is determined, and the X coordinate of the balloon 22 is automatically determined if the X coordinate of the pressed position is determined (since the X coordinate of the menu 20 is finally determined in the processes of S304 and S306, the X coordinate of the menu 20 is not automatically determined only by the X coordinate of the pressed position).

Specifically, it is assumed that the visible area of the target is (x1, y1) to (x2, y3), and the tap position as the pressed position is (xt, yt), here, x1<xt<x2, and y1<yt<y3.

Further, if the Y coordinate of the tip of the balloon 22 is yc+b with respect to the center coordinate (xc, yc) of the menu 20, the X coordinate of the menu 20 xc=xt, and the Y coordinate of the menu 20 yc=y1−b+α.

However, a is the amount that the tip of the balloon covers the upper side of the visible area of the target.

Further, the coordinates (xf, yf) of the tip of the balloon 22 are as follows:

the X coordinate of the balloon 22 xf=xt, and
the Y coordinate of the balloon 22 yf=yc+b=y1+α.

In a case where the left end of the menu 20 cannot fit on the screen, the X coordinate of the menu 20 is corrected as xc=xt+β.

However, β is an amount necessary for the left end to be apart from the left end of the screen by a predetermined amount (for example, five pixels).

Further, the coordinates of the tip of the balloon 22 are as follows:

the X coordinate xf of the balloon 22=xt, and
the Y coordinate yf of the balloon 22=y1+α.

In a case where both ends of the menu 20 can fit on the screen, xc=xf, but in a case where both ends of the menu 20 cannot fit on the screen, the pressed position is prioritized, such that the X coordinate of the balloon 22 deviates from the center position xc of the menu 20 and is xc xf.

That is, the position of the balloon 22 in the X direction is relatively displaced from the center of the menu 20 in the X direction.

If the Y coordinate and the X coordinate are determined as described above, the controller 104 pops up the menu 20 and the balloon 22 at the determined Y coordinate and X coordinate (S305).

Pop-Up Display on Lower Side of Target

The case of pop-up display on the lower side of the target is basically the same as the case of pop-up display on the upper side of the target. However, the process of S301 is replaced with a process of determining whether or not there is a margin on the lower side of the target, and the process of S302 is changed to the process of determining the Y coordinate such that a balloon covers the lower side of the visible area of the target.

Figure 15:
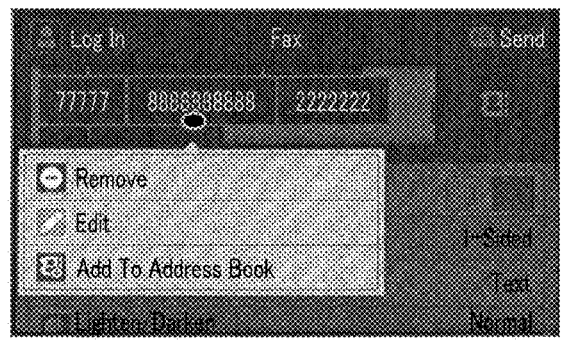
FIG. 15 is a detailed diagram for popping up the menu on the lower side of the target.

FIG. 15 shows an example of displaying the menu 20 on the lower side of the target. This is an example of a case where the left end and the right end of the menu 20 can fit on the screen, and the X coordinate of the menu 20 is determined such that the X coordinate of the tap position as the pressed position is the center of the menu 20. The X coordinate of the balloon 22 is also the center position of the menu 20.

Pop-Up Display on Left Side of Target

Figure 16:
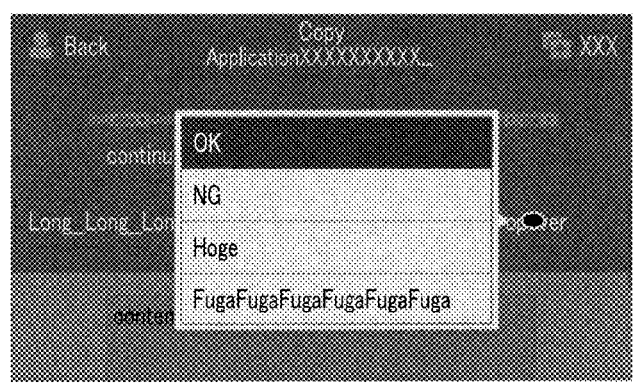
FIG. 16 is a detailed diagram (part 1) for popping up the menu on the left side of the target.
Figure 17:
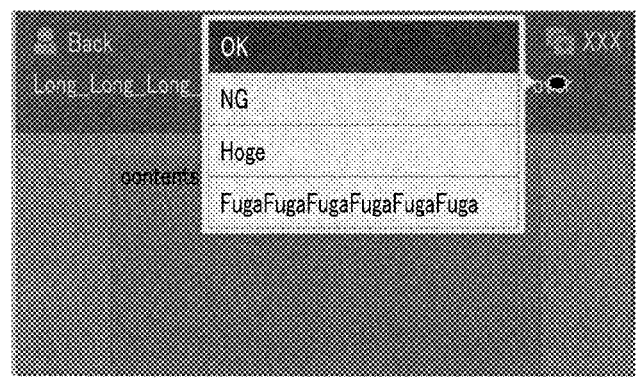
FIG. 17 is a detailed diagram (part 2) for popping up the menu on the left side of the target.

FIGS. 16 and 17 show the details in a case of displaying the menu 20 and the balloon 22 on the other sides of the target. In a case of displaying the menu 20 and the balloon 22 on the left side of the target, the X coordinate thereof is determined such that the tip of the balloon 22 is separated away to the left from the pressed position by a predetermined amount (for example, 30 pixels). Here, 30 pixels are set in order to prevent the balloon from being hidden by the tapped finger. The Y coordinate is determined to be the same as the pressed position. The balloon 22 is determined to be the center position in the Y direction of the menu 20. As shown in FIG. 17, there may be a case where the balloon 22 cannot be displayed at the center position in the Y direction of the menu 20 depending on the pressed position, but in this case, the Y coordinate of the balloon 22 is determined by prioritizing the pressed position.

Figure 18:
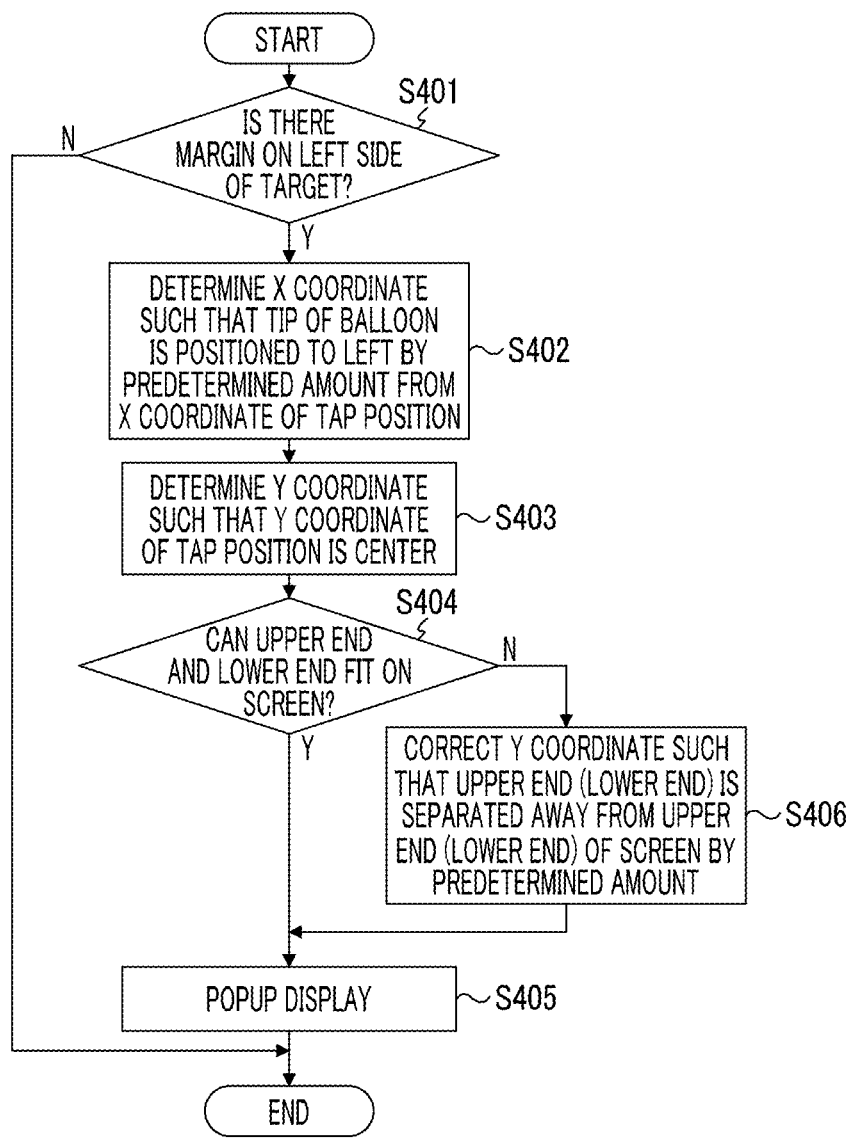
FIG. 18 is a processing flowchart for popping up the menu on the left side of the target.

FIG. 18 is a detailed flowchart of S104.

The controller 104 determines whether there is a margin for displaying the menu 20 and balloon 22 on the left side of the target (S401). If there is not sufficient margin on the left side of the target, it is determined to be NG and the process proceeds to S405.

If there is a sufficient margin on the left side of the target (YES in S402), the X coordinate of the menu 20 is determined such that the tip of the balloon 22 is positioned to the left by a predetermined amount (30 pixels) from the tap position which is the pressed position (S402). Further, the Y coordinate is determined such that the Y coordinate of the tap position is the center in the Y direction of the menu 20 (S403).

Next, the controller 104 determines whether or not the upper end and the lower end of the menu 20 can fit on the screen of the display 107 at the X coordinate and the Y coordinate determined in this way (S404). In a case where the upper end and the lower end can fit on the screen (S404), the menu 20 and the balloon 22 are popped up at the determined X coordinate and Y coordinate (S405).

On the other hand, in a case where the upper end cannot fit on the screen (NO in S404), the controller 104 corrects the Y coordinate such that the upper end of the menu 20 is separated away from the upper end of the screen by a predetermined amount (for example, five pixels) (S406). The same applies to a case where the lower end cannot fit on the screen, and the controller 104 corrects the Y coordinate such that the lower end of the menu 20 is separated away from the lower end of the screen by five pixels. Then, the menu 20 and the balloon 22 are popped up at the corrected Y coordinate and X coordinate (S405).

Specifically, it is assumed that the visible area of the target is (x1, y1) to (x2, y3), and the tap position as the pressed position is (xt, yt), here, x1<xt<x2, and y1<yt<y3.

Further, if the X coordinate of the tip of the balloon 22 is xc+a with respect to the center coordinate (xc, yc) of the menu 20, the X coordinate of the menu 20 xc=xt−30−a, and
the Y coordinate of the menu 20 yc=yt.

Here, "−30" in the calculation of the X coordinate is an adjustment term for moving the X coordinate to the left by 30 pixels from the tap position.

Further, the coordinates (xf, yf) of the tip of the balloon 22 are as follows:

the X coordinate of the balloon 22 xf=xc+a=xt−30, and
the Y coordinate of the balloon 22 yf=yt.

In a case where the upper end of the menu 20 cannot fit on the screen, the Y coordinate of the menu 20 is corrected as yc=yt+γ.

However, γ is an amount necessary for the upper end to be apart from the upper end of the screen by a predetermined amount (for example, five pixels).

Further, the coordinates of the tip of the balloon 22 are as follows:

the X coordinate xf of the balloon 22=xt−30, and
the Y coordinate yf of the balloon 22=yt.

In a case where both ends of the menu 20 can fit on the screen, yc=yf, but in a case where both ends of the menu 20 cannot fit on the screen, the pressed position is prioritized, such that the Y coordinate of the balloon 22 deviates from the center position yc of the menu 20 and is yc=yf.

That is, the position of the balloon 22 in the Y direction is relatively displaced from the center of the menu 20 in the Y direction.

Pop-Up Display on Right Side of Target

The case of pop-up display on the right side of the target is basically the same as the case of pop-up display on the left side of the target. However, the process of S401 is replaced with the process of determining whether or not there is a margin on the right side of the target, and the process of S402 is changed to a process of determining the X coordinate of the menu 20 such that the tip of the balloon is moved to the right from the X coordinate of the tap position by a predetermined amount (for example, 30 pixels).

Pop-Up Display with Right Alignment or Left Alignment

Figures 19A, 19B:
FIGS. 19A and 19B are detailed diagrams for popping up the menu to right.

FIGS. 19A and 19B show the details in a case of displaying the menu 20 and the balloon 22 with right alignment or left alignment. In a case where the size of the menu 20 is close to the size of the screen of the display 107, there may be a case where the menu 20 cannot be displayed as a whole on any of the upper side, the left side, the right side, and the lower side of the target, depending on the pressed position, as shown in FIG. 19A. This problem may arise especially in a case where the screen size of the display 107 is small. In such a case, if the X coordinate of the pressed position is on the left side of the center of the screen, as shown in FIG. 19B, the X coordinate is determined such that the left end of the menu 20 is separated away from the left end of the screen by a predetermined amount (for example, 40 pixels), and if the X coordinate of the pressed position is on the right side of the center of the screen, the X coordinate is determined such that the right end of the menu 20 is separated away from the right end of the screen by a predetermined amount (for example, 40 pixels). Here, means for pressing down a margin portion outside the pop-up display is known as one of means for closing the popped up menu 20, but it is meaningful to secure the margin area for closing the menu 20 by determining the X coordinate as described above.

Figure 20:
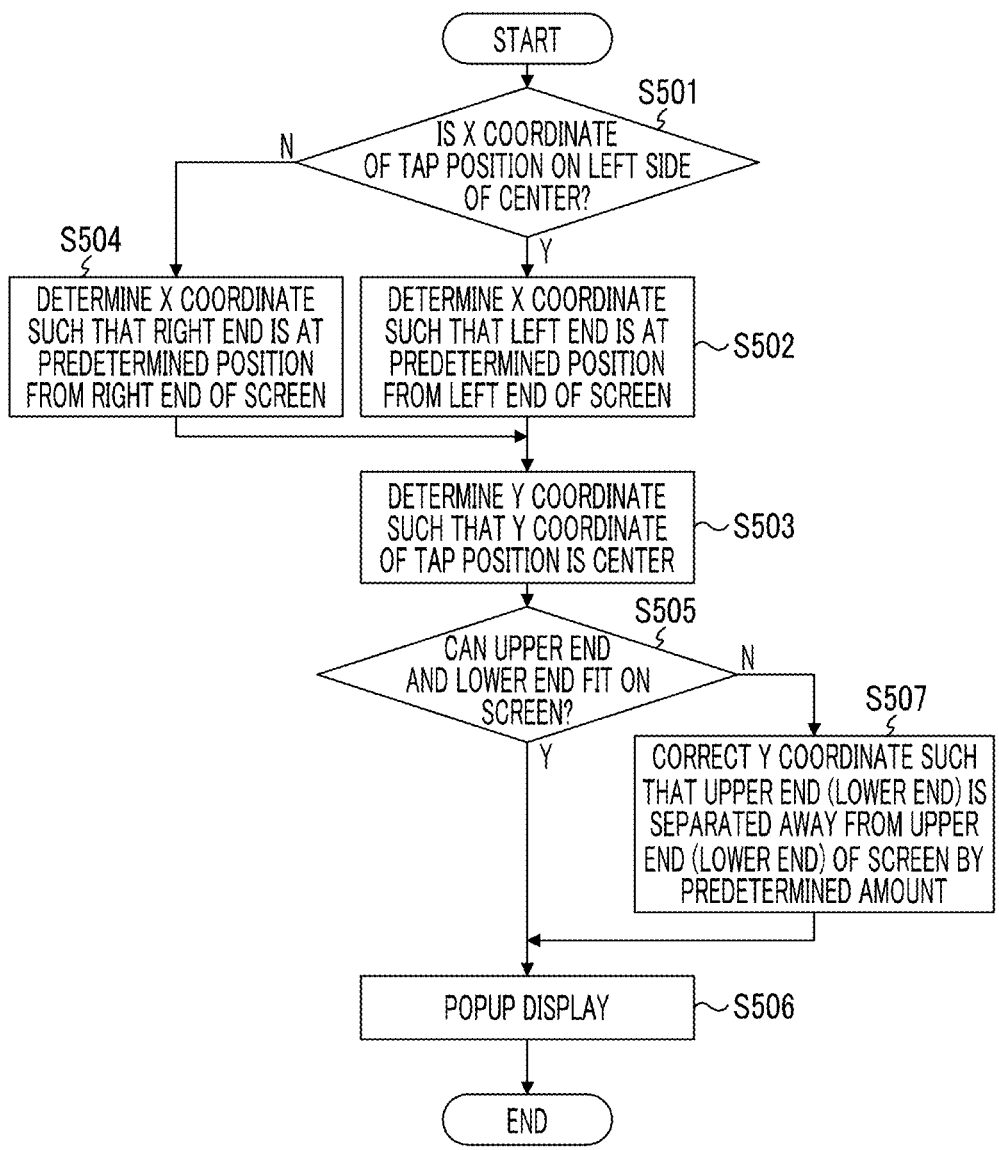
FIG. 20 is a process flowchart for popping up the menu to right or left.

FIG. 20 is a detailed flowchart of S107.

The controller 104 determines whether or not the X coordinate of the tap position as the pressed position is on the left side of the center of the screen (S501).

If it is on the left side of the center of the screen (YES in S501), the X coordinate of the menu 20 is determined such that the left end of the menu 20 is separated away from the left end of the screen by a predetermined amount (for example, 40 pixels) (S502). Further, the Y coordinate is determined such that the Y coordinate of the tap position is the center in the Y direction of the menu 20 (S503). On the other hand, if it is not on the left side of the center of the screen (NO in S501), the X coordinate of the menu 20 is determined such that the right end of the menu 20 is separated away from the right end of the screen by a predetermined amount (for example, 40 pixels) (S504). Then, the Y coordinate is determined such that the Y coordinate of the tap position is the center in the Y direction of the menu 20 (S503).

After determining the X coordinate and the Y coordinate, the controller 104 determines whether or not the upper end and the lower end of the menu 20 can fit on the screen on the display 107 (S505). When the upper end and the lower end can fit on the screen (YES in S505), the menu 20 and the balloon 22 are popped up at the determined X coordinate and Y coordinate (S506). If the upper end of the menu 20 cannot fit on the screen (NO in S505), the Y coordinate is corrected such that the upper end of the menu 20 is separated away from the upper end of the screen by a predetermined amount (for example, five pixels) (S507). The same applies to the case where the lower end of the menu 20 cannot fit on the screen, and the Y coordinate is corrected such that the lower end of the menu 20 is located apart from the lower end of the screen by a predetermined amount (for example, five pixels) (S507). Then, the menu 20 and the balloon 22 are popped up at the corrected Y coordinate and X coordinate (S506).

Although the exemplary embodiment of the present invention has been described above, the present invention is not limited thereto, and various modifications are possible. Hereinafter, modifications will be described.

Modification 1

In the exemplary embodiment, the priority for popping up the menu 20 and the balloon 22 is as follows:
(1) Upper side of target
(2) Left side of target
(3) Right side of target
(4) Lower side of target.

However, this may appropriately be changed, and the priority may be determined according to the dominant arm of the user.

Specifically, in a case where the user is right-handed, the above priority is set; and in a case where the user is left-handed, the priority is set as follows:
(1) Upper side of target
(2) Right side of target
(3) Left side of target
(4) Lower side of target.

The dominant arm of the user is previously registered in the memory as authentication information. In a case where the user logs in, the dominant arm of the user is determined based on the authentication information of the user, and the priority corresponding to the dominant arm may be determined.

Modification 2

The shape of the balloon 22 is a triangle in the exemplary embodiment, but any shape such as a rectangle, an ellipse, a rhombus, and a beak may be used. In addition, the color of the balloon 22 may also be different from that of the menu 20, as well as may be the same as that of the menu 20.

Modification 3

The menu 20 and the balloon 22 are popped up to left or right, in a case where the size of the menu 20 is close to the size of the screen of the display 107, and the menu 20 cannot be displayed on any of the upper side, the left side, the right side, and the lower side of the target depending on the pressed position, in the exemplary embodiment. However, in this case, since the balloon 22 does not necessarily indicate directly the pressed position (it is possible to visually recognize which one of the left side and the right side of the screen is pressed), the shape of the balloon 22 may be changed to a specific shape indicating that the pressed position is hidden under the menu 20.

Modification 4

The menu 20 is displayed with right alignment or left alignment in a case where the menu 20 cannot be displayed on any of the upper side, the left side, the right side, and the lower side of the target, in the exemplary embodiment, but in more detail, the menu 20 and the balloon 22 may be displayed according to the following rule.

That is, regarding the menu 20,

X coordinate:

in a case where the right half of the display 107 is tapped, a point with a smaller value between a point inwardly from the right end of the target by a predetermined amount (for example, 20 pixels) and a point inwardly from the right end of the screen by a predetermined amount (for example, 40 pixels) is set to the right end of the right alignment, and in a case where the left half of the display 107 is tapped, a point with a smaller value between a point inwardly by a predetermined amount (for example, 20 pixels) from the left end of the target and a point inwardly by a predetermined amount (for example, 40 pixels) from the left end of the screen is set to the left end of the left alignment.

Y coordinate:

the coordinate in the Y direction of the target.

With respect to the balloon 22,

X coordinate: the right side of the menu 20 in a case of tapping the right half of the display 107, and the left side of the menu 20 in a case of tapping the left half of the display 107.

Y coordinate: the coordinate in the Y direction of the target.

In addition, in a case of displaying the menu 20 with right alignment or left alignment, the balloon 22 is also displayed in the right direction or the left direction, but the balloon 22 may not indicate accurately the target depending on the target in some cases. In this case, the height of the menu 20, that is, the width in the Y direction may be reduced and the balloon 22 may be displayed in the upward direction or downward direction. For example, the number of pixels which is a threshold for determining that the tip of the balloon 22 correctly indicates the target is set, and in the case where it exceeds the number of pixels, the width in the Y direction of the menu 20 is reduced.

Modification 5

The menu 20 is displayed in the center of the screen on the display 107 in a case where the menu 20 cannot be displayed on any of the upper side, the left side, the right side, and the lower side of the target, and the menu 20 cannot be displayed even with right alignment or left alignment, in the exemplary embodiment, but in addition thereto, the menu may be displayed according to the following rule.

X coordinate:

in a case where the right half of the display 107 is tapped, a position away from the right end of the screen by a predetermined amount (for example, 40 pixels) is assumed as the right end of the menu 20, and in a case where the left half of the display 107 is tapped, a position away from the left end of the screen by a predetermined amount (for example, 40 pixels) is assumed as the left end of the menu 20.

Y coordinate: the coordinate of the center of the screen. Even in this case, the balloon 22 may not be displayed because it is difficult for the balloon to indicate the target.

Modification 6

Although the image forming apparatus 14 is connected to the communication unit 16 and receives a print job from the terminal apparatus 12 as shown in FIG. 2 in the exemplary embodiment, the image forming apparatus 14 may not be connected to the communication unit 16, and may be stand-alone. Further, the image forming apparatus 14 may be configured such that the operation unit 146 including the touch panel can be separated from a main body and the user can operate the main body remotely by operating the operation unit 146.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
a display;
a sensor that detects an operation position of a user on the display; and
a controller that selects a position of an entire menu corresponding the detected operation position from a plurality of preset positions with respect to the detected operation position, determines whether the selected position corresponding to the detected operation position has space to accommodate the entire menu according to a plurality of ends of a screen of the display and coordinates of the entire menu at the selected position, corrects the coordinates of the entire menu when the entire menu is not entirely displayable on the screen, displays the entire menu corresponding to the detected operation position at a position corresponding to the operation position in response to the selected position corresponding to the detected operation position having space to accommodate the entire menu, and displays a balloon indicating the operation position.

2. The display apparatus according to claim 1, wherein the controller selectively displays the entire menu on any of an upper side, a left side, a right side, and a lower side of the operation position according to a priority algorithm.

3. The display apparatus according to claim 2, wherein in a case where the entire menu cannot be displayed on any of the upper side, the left side, the right side, and the lower side of the operation position, the controller displays the menu with right alignment or left alignment to the display.

4. The display apparatus according to claim 2, wherein in a case where the operation position is a scrollable area, the controller displays the entire menu, with a boundary of a visible area in the scrollable area as a reference.

5. The display apparatus according to claim 2, wherein the controller displays the balloon so as to match the center position of the menu, and displays the balloon so as to match the operation position in a case where the balloon cannot be displayed so as to match the center position of the menu.

6. The display apparatus of claim 1, wherein
the controller is further configured to correct the coordinates of the selected position to accommodate the entire menu so that the entire menu is displayable and separated away from each of the ends of the screen by a predetermined correction amount.

7. The display apparatus of claim 1, wherein the size of the entire menu remains the same before and after the coordinates thereof are corrected, and wherein a displayable content on the entire menu remains the same before and after the coordinates thereof are corrected.

8. An image forming apparatus comprising:
a display;
a sensor that detects an operation position of a user on the display;
a controller that performs an image forming process in response to an operation of the user, selects a position of the entire menu corresponding the detected operation position from a plurality of preset positions with respect to the detected operation position, determines whether the selected position corresponding to the detected operation position has space to accommodate the entire menu according to a plurality of ends of a screen of the display and coordinates of the entire menu at the selected position, corrects the coordinates of the entire menu when the entire menu is not entirely displayable on the screen, displays the entire menu corresponding to the detected operation position at a position corresponding to the operation position in response to the selected position corresponding to the detected operation position having space to accommodate the entire menu, and displays a balloon indicating the operation position.

9. A non-transitory computer readable medium storing a program causing a computer to execute:
- detecting an operation position of a user on a display;
- selecting a position of an entire menu corresponding the detected operation position from a plurality of preset positions with respect to the detected operation position;
- determining whether the selected position corresponding to the detected operation position has space to accommodate the entire menu according to a plurality of ends of a screen of the display and coordinates of the entire menu at the selected position;
- correcting the coordinates of the entire menu when the entire menu is not entirely displayable on the screen; and
- displaying the entire menu corresponding to the detected operation position at a position corresponding to the operation position in response to the selected position corresponding to the detected operation position having space to accommodate the entire menu, and displaying a balloon indicating the operation position.

* * * * *